(12) United States Patent
Mandal

(10) Patent No.: US 7,675,814 B2
(45) Date of Patent: Mar. 9, 2010

(54) METHOD AND APPARATUS FOR GENERATING ACOUSTIC SIGNALS WITH A SINGLE MODE OF PROPAGATION

(75) Inventor: Batakrishna Mandal, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 12/325,756

(22) Filed: Dec. 1, 2008

(65) Prior Publication Data

US 2009/0073806 A1    Mar. 19, 2009

Related U.S. Application Data

(63) Continuation of application No. 10/947,973, filed on Sep. 23, 2004, now abandoned.

(51) Int. Cl.
*G01V 1/00*  (2006.01)
*G01V 1/40*  (2006.01)

(52) U.S. Cl. ......................................... 367/35; 181/105

(58) Field of Classification Search .................. 367/25, 367/26, 27, 28, 29, 30, 31, 32, 33, 34, 35; 181/105

See application file for complete search history.

(56) References Cited

U.S. PATENT DOCUMENTS

| | | | |
|---|---|---|---|
| 4,346,460 A | 8/1982 | Schuster | |
| 4,832,148 A * | 5/1989 | Becker et al. | ............... 181/104 |
| 4,855,963 A | 8/1989 | Winbow et al. | |
| 4,932,003 A | 6/1990 | Winbow et al. | |
| RE33,472 E | 12/1990 | Chung | |
| 5,027,331 A | 6/1991 | Winbow et al. | |
| 5,159,577 A | 10/1992 | Twist | |
| 5,168,470 A | 12/1992 | Dennis | |
| 5,251,286 A | 10/1993 | Wiener et al. | |
| 5,309,404 A | 5/1994 | Kostek et al. | |
| 5,434,575 A * | 7/1995 | Jelinek et al. | ............... 342/365 |
| 5,444,619 A | 8/1995 | Hoskins et al. | |

(Continued)

OTHER PUBLICATIONS

"Australia Office Action", dated Aug. 29, 2008, Appl No. 2006216843, "Acoustic Logging-While-Drilling Tools Having a Hexapole Source Configuration and Associated Logging Methods", filed Feb. 6, 2006, 2 pages.

(Continued)

*Primary Examiner*—Jack W. Keith
*Assistant Examiner*—Krystine Saito
(74) *Attorney, Agent, or Firm*—Krueger Iselin LLP

(57) ABSTRACT

A method and apparatus for generating an acoustic signal having a single mode of propagation along borehole walls. The method includes generating an n-pole (monopole, dipole, quadrupole, and so on) acoustic signal and calculating the tool position and borehole shape from the signals received at one or more receivers. If the tool contains matched sources and balanced receivers, is in the center of the borehole, and the borehole is circular, the pure, single mode acoustic signal will propagate along the borehole walls with a single mode of propagation. If the acoustic signal traveling along borehole walls does not have a single mode of propagation, the signal's amplitudes and time delays are adjusted to produce a second acoustic signal. The second acoustic signal's amplitudes and time delays are further adjusted until the signal traveling along the borehole walls has a single mode of propagation.

20 Claims, 8 Drawing Sheets

U.S. PATENT DOCUMENTS

| | | | |
|---|---|---|---|
| 5,541,890 A | | 7/1996 | Tang |
| 5,640,371 A | * | 6/1997 | Schmidt et al. ............. 367/153 |
| 5,678,643 A | | 10/1997 | Robbins et al. |
| 5,724,308 A | | 3/1998 | Sorrells et al. |
| 5,753,812 A | | 5/1998 | Aron et al. |
| 5,784,333 A | | 7/1998 | Tang et al. |
| 5,828,981 A | | 10/1998 | Callender et al. |
| 5,862,513 A | | 1/1999 | Mezzatesta et al. |
| 5,869,968 A | | 2/1999 | Brooks et al. |
| 5,886,303 A | | 3/1999 | Rodney |
| 6,023,443 A | | 2/2000 | Dubinsky et al. |
| 6,067,053 A | * | 5/2000 | Runyon et al. ............. 343/797 |
| 6,188,961 B1 | | 2/2001 | Mandal |
| 6,366,531 B1 | * | 4/2002 | Varsamis et al. ............. 367/26 |
| 6,449,560 B1 | | 9/2002 | Kimball |
| 6,474,439 B1 | | 11/2002 | Hoyle et al. |
| 6,510,104 B1 | | 1/2003 | Ikegami |
| 6,552,962 B1 | | 4/2003 | Varsamis et al. |
| 6,568,486 B1 | | 5/2003 | Wallace et al. |
| 6,614,716 B2 | | 9/2003 | Plona et al. |
| 6,618,322 B1 | | 9/2003 | Georgi |
| 6,631,327 B2 | | 10/2003 | Hsu |
| 6,661,737 B2 | * | 12/2003 | Wisniewski et al. ........... 367/25 |
| 6,712,138 B2 | | 3/2004 | Mandal |
| 6,750,783 B2 | | 6/2004 | Rodney |
| 6,930,616 B2 | | 8/2005 | Tang |
| 2002/0113717 A1 | | 8/2002 | Tang et al. |
| 2002/0152030 A1 | | 10/2002 | Schultz |
| 2003/0002388 A1 | | 1/2003 | Mandal |
| 2003/0037963 A1 | | 2/2003 | Barr et al. |
| 2003/0156494 A1 | | 8/2003 | McDaniel et al. |
| 2004/0039466 A1 | | 2/2004 | Lilly et al. |
| 2004/0257911 A1 | * | 12/2004 | Tang et al. .................... 367/81 |
| 2005/0185510 A1 | | 8/2005 | Haugland |
| 2007/0183259 A1 | * | 8/2007 | Yogeswaren et al. .......... 367/25 |

OTHER PUBLICATIONS

"PCT International Preliminary Report on Patentability", dated Apr. 4, 2006, Appl No. PCT/US05/034245, "Method and apparatus for Generating Acoustic Signal with Single Mode or Propagation", filed Sept. 22, 2005, 7 pages.

"PCT International Preliminary Report on Patentability", dated Jul. 10, 2006, Appl No. PCT/US06/005901, "Acoustic Logging-While-Drilling Tools Having a Hexapole Source Configuration and Associated Logging Methods", filed Feb. 17, 2006, 9 pages.

"PCT International Search Report and Written Opinion", dated Jul. 10, 2006, Appl No. PCT/US06/05901, "Acoustic Logging-While-Drilling Tools Having a Hexapole Source Configuration and Associated Logging Methods", filed Feb. 17, 2006, 13 pages.

"PCT International Search Report and Written Opinion", dated Jul. 23, 2008, Appl No. PCT/US07/12087, "Logging System and Methods with Tilt Compensation for Sector Based Acoustic . . . ", filed May 21, 2007, 10 pages.

"PCT International Search Report", dated Apr. 4, 2006, Appl No. PCT/US05/034245, "Method and Apparatus for Generating Acoustic Signal with Single Mode of Propagation", filed Sept. 22, 2005, 3 pages.

"U.K. Office Action", dated Feb. 19, 2008, Appl No. GB 0714369.6, "Acoustic Logging-While-Drilling Tools Having a Hexapole Source Configuration and Associated Logging Methods", filed Jul. 23, 2007, 2 pages.

"U.S. Advisory Action", dated Feb. 16, 2007, U.S. Appl. No. 11/062,395, "Acoustic Logging-While-Drilling Tools Having a Hexapole Source Configuration and Associated Logging Methods", filed Feb. 22, 2005, 3 pages.

"U.S. Advisory Action", dated Mar. 13, 2008, U.S. Appl. No. 11/062,395, "Acoustic Logging-While-Drilling Tools Having a Hexapole Source Configuration and Associated Logging Methods", filed Feb. 22, 2005, 3 pages.

"U.S. Advisory Action", dated May 21, 2008, U.S. Appl. No. 11/062,395, "Acoustic Logging-While-Drilling Tools Having a Hexapole Source Configuration and Associated Logging Methods", filed Feb. 22, 2005, 3 pages.

"U.S. Advisory Action", dated Oct. 22, 2008, U.S. Appl. No. 10/947,973, "Method and Apparatus for Generating Acoustic Signal with Single Mode or Propagation", filed Sep. 23, 2004, 3 pages.

"U.S. Advisory Action", dated Dec. 1, 2006, U.S. Appl. No. 10/947,973, "Method and Apparatus for Generating Acoustic Signal with Single Mode or Propagation", filed Sep. 23, 2004, 3 pages.

"U.S. Advisory Action", dated Dec. 15, 2008, U.S. Appl. No. 10/947,973, "Method and Apparatus for Generating Acoustic Signal with Single Mode or Propagation", filed Sep. 23, 2004, 29 pages.

"U.S. Final Office Action", dated Jul. 30, 2008, U.S. Appl. No. 10/947,973, "Method and Apparatus for Generating Acoustic Signal with Single Mode or Propagation", filed Sep. 23, 2004, 18 pages.

"U.S. Final Office Action", dated Aug. 8, 2006, U.S. Appl. No. 10/947,973, "Method and Apparatus for Generating Acoustic Signal with Single Mode or Propagation", filed Sep. 23, 2004, 16 pages.

"U.S. Final Office Action", dated Aug. 20, 2007, U.S. Appl. No. 10/947,973, "Method and Apparatus for Generating Acoustic Signal with Single Mode or Propagation", filed Sep. 23, 2004, 20 pages.

"U.S. Final Office Action", dated Oct. 12, 2006, U.S. Appl. No. 11/062,395, "Acoustic Logging-While-Drilling Tools Having a Hexapole Source Configuration and Associated Logging Methods", filed Feb. 22, 2005, 11 pages.

"U.S. Final Office Action", dated Nov. 15, 2007, U.S. Appl. No. 11/062,395, "Acoustic Logging-While-Drilling Tools Having a Hexapole Source Configuration and Associated Logging Methods", filed Feb. 22, 2005, 8 pages.

"U.S. Non Final Office Action", dated Jan. 25, 2008, U.S. Appl. No. 10/947,973, "Method and Apparatus for Generating Acoustic Signal with Single Mode or Propagation", filed Sep. 23, 2004, 18 pages.

"U.S. Non-Final Office Action", dated Feb. 28, 2006, U.S. Appl. No. 10/947,973, "Method and Apparatus for Generating Acoustic Signal with Single Mode or Propagation", filed Sep. 23, 2004, 11 pages.

"U.S. Non-Final Office Action", dated Mar. 14, 2007, U.S. Appl. No. 10/947,973, "Method and Apparatus for Generating Acoustic Signal with Single Mode or Propagation", filed Sep. 23, 2004, 15 pages.

"U.S. Non-Final Office Action", dated Jun. 5, 2007, U.S. Appl. No. 11/062,395, "Acoustic Logging-While-Drilling Tools Having a Hexapole Source Configuration and Associated Logging Methods", filed Feb. 22, 2005, 12 pages.

"U.S. Non-Final Office Action", dated Jun. 9, 2006, U.S. Appl. No. 11/062,395, "Acoustic Logging-While-Drilling Tools Having a Hexapole Source Configuration and Associated Logging Methods", filed Feb. 22, 2005, 8 pages.

Advanced Logic Technology, "ABI 40", Slimhole Acoustic Televiewer, Release 2002, 2 pages.

Byun, Joongmoo, et al., "Effects of Source Mismatch on Multipole Logging", 2004 ERL Consortium, 13 pages.

Byun, Joongmoo, et al, "Effects of an Off-Centered Tool on Multicomponent Monopole and Dipole Logging", Cambridge, MA, (Aug. 9, 2006), 17 pages.

Ellefsen, et al., "Effects of Anisotropy Upon the Normal Modes in a Borehole", J. Acoustic Society of America, Cambridge, MA (Jun. 1991), 22 pages.

Frisch, Gary J., et al., "Advanced Ultrasonic Scanning Tool and Evaluation Methods Improve and Standardize Casing Inspection", SPWLA 42nd Annual Logging Symposium, (Jun. 17-20, 2001), pp. 1-14.

Fung, C. C., et al., "Modular Artificial Neural Network for Prediction of Petrophysical properties from Well Log Data", IEEE Instrumentation & Measurement Tech Conf, (Jun. 4, 1996). 5 pages.

Granitto, P M., et al., "Modeling of Sonic Logs in Oil Wells with Neural Network Ensembles", Argentine Symposium on Artificial Intelligence (ASAI'01) (Bs. As., Sep. 12, 2001, http://citeseer.ist.psu.edu/granitto01modeling.html,(Sep. 12-13, 2001), 7 pages.

Liu, Y., et al., "Ensemble Learning Via Negative Correlation", Neural Networks, vol. 12, Issue 10, www.elsevier.com/locate/neunet, (Dec. 1999), pp. 1399-1404.

Optiz, D.W. et al., "A Genetic Algorithm Approach for Creating Neural-Network Ensembles", Combining Artificial Neural Nets, http:/citeseer.ist.psu.edu/opitz99genetic.html, Springer-Verlag, London, (1999), pp. 79-99.

Russell, Dan, "Acoustic Animations", Kettering University Applied Physics, (May 3, 1999), 3 pages.

International Preliminary Report on Patentability and Written Opinion, dated Sep. 7, 2007, Appl No. PCT/US06/005901, "Acoustic Logging-While-Drilling Tools Having a Hexapole Source Configuration and Associated Logging Methods", filed Feb. 22, 2005, 9 pgs.

U.S. Examiner's Response to Appeal Brief, dated Oct. 15, 2008, U.S. Appl. No. 11/062,395, Acoustic Logging-While-Drilling Tools Having a Hexapole Source Configuration and Associated Logging Methods, filed Feb. 22, 2005, 10 pgs.

AU Second Office Action, dated Jun. 1, 2009 Appl No. 2006216843, "Acoustic Logging-While-Drilling Tools Having a Hexapole Source Configuration and Associated Logging Methods", filed Feb. 6, 2006, 3 pgs.

* cited by examiner

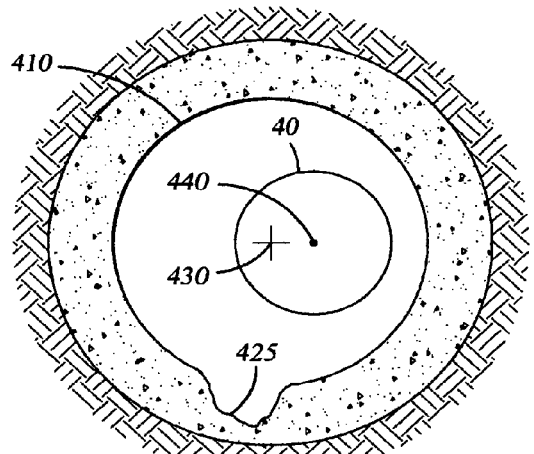
Fig. 4
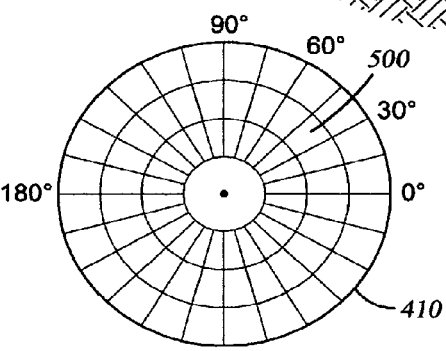
Fig. 5A  MONOPOLE
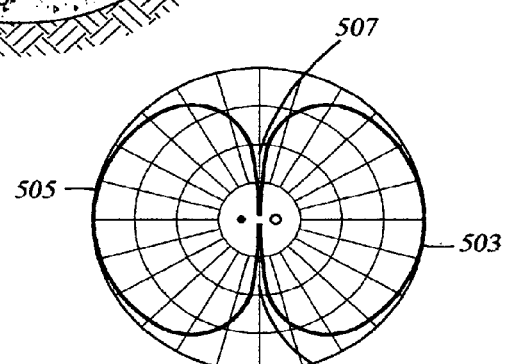
Fig. 5B  DIPOLE
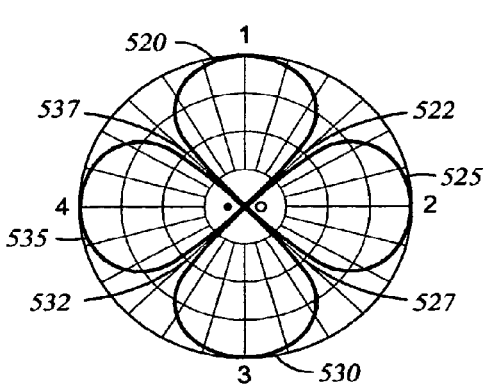
Fig. 5C  QUADRUPOLE
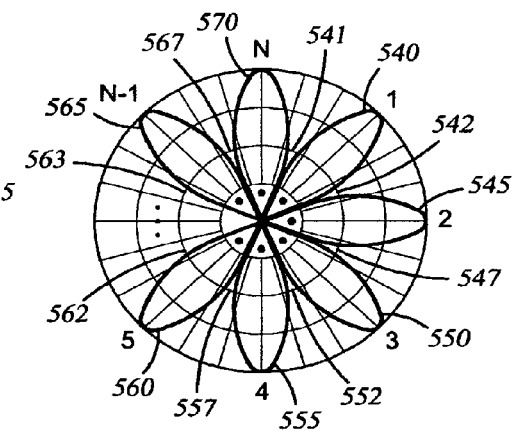
Fig. 5D  N-POLE

METHOD AND APPARATUS FOR GENERATING ACOUSTIC SIGNALS WITH A SINGLE MODE OF PROPAGATION

CROSS-REFERENCE TO RELATED APPLICATIONS

The present application is a continuation of U.S. patent application Ser. No. 10/947,973, entitled "Method and Apparatus for Generating Acoustic Signal with Single Mode of Propagation" and filed Sep. 23, 2004. The foregoing application is hereby incorporated herein in its entirety.

TECHNICAL FIELD OF THE INVENTION

The present invention relates to formation logging techniques. More particularly, the present invention relates to a method and apparatus for generating an n-pole (e.g. monopole, dipole, quadrupole, hexapole and so on) acoustic signal with a single mode of propagation along the walls of a borehole.

BACKGROUND OF THE INVENTION

Petroleum drilling and production operations require large quantities of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging," can be performed by several techniques.

In conventional oil well wireline logging, a probe or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

The problem with obtaining downhole measurements via wireline is that the drilling assembly must be removed from the drilled borehole before the desired borehole information can be obtained. This can be both time-consuming and extremely costly, especially in situations where a substantial portion of the well has been drilled. In this situation, thousands of feet of tubing may need to be removed and stacked on the platform (if offshore). Typically, drilling rigs are rented by the day at a substantial cost. Consequently, the cost of drilling a well is directly proportional to the time required to complete the drilling process. Removing thousands of feet of tubing to insert a wireline logging tool can be an expensive proposition.

As a result, there has been an increased emphasis on the collection of data during the drilling process. Collecting and processing data during the drilling process eliminates the necessity of removing the drilling assembly to insert a wireline logging tool. It consequently allows the driller to make accurate modifications or corrections as needed to optimize performance while minimizing down time. Designs for measuring conditions and formation properties downhole including the movement and location of the drilling assembly contemporaneously with the drilling of the well have come to be known as "logging-while-drilling" techniques, or "LWD."

When oil wells or other boreholes are being drilled, it is frequently necessary or desirable to determine the direction and inclination of the drill bit and downhole motor so that the assembly can be steered in the correct direction. Additionally, information may be required concerning the nature of the strata being drilled, such as the formation's resistivity, velocity, porosity, density and its measure of gamma radiation. It is also frequently desirable to know other downhole parameters, such as the temperature and the pressure at the base of the borehole, for example. Once this data is gathered at the bottom of the borehole, it is necessary to communicate it to the surface for use and analysis by the driller.

In LWD systems, sources and receivers are typically located at the lower end of the drill string. Typically, the downhole sources and receivers employed in LWD applications are positioned in a cylindrical drill section that is positioned close to the drill bit. As the drill bit progresses through the formation, drilling noise, the noncircular shape of the borehole, and the location of the logging tool in the borehole may effect the collection of formation data. Each of the sources may be programmed to generate a pure n-pole acoustic signal with a single mode of propagation. Thus, n=1 is a monopole acoustic signal with monopole mode of propagation, n=2 dipole acoustic signal with dipole mode of propagation, n=4 quadrupole acoustic signal, n=6 hexapole acoustic signal, and so on. Acoustic signals generated by the sources travel through the borehole, and along the borehole walls of the formation or into the formation depending on the velocity of the acoustic signal in the formation ($V_f$) and the velocity of the acoustic signal in the borehole ($V_b$). Each type of n-pole acoustic signal permits determination of different formation properties as described in more detail below. If the borehole is not circular, the tool is not in the center of the borehole, the sources are mismatched (i.e., sources given the same input do not generate identical acoustic signals), or the receivers are not balanced (i.e., receivers see identical acoustic signals at their inputs but generate varying electrical outputs for each signal), the signals at the receivers may have multiple modes of propagation (e.g., signal with both monopole mode and dipole modes of propagation). An acoustic signal with multiple modes of propagation arriving at the receivers interfere with each other and make the determination of formation properties inaccurate and difficult.

Thus, there is a continuing need for generating an n-pole acoustic signal with a single mode of propagation along the walls of the borehole that compensates for drilling noise, noncircular imperfections in the shape of the borehole, and the location of the logging tool in the borehole.

SUMMARY OF THE INVENTION

According to an embodiment of the present invention, a method and logging tool apparatus are provided for generating an acoustic signal having a single mode of propagation along borehole walls. The method includes generating an n-pole acoustic signal and calculating the tool position and borehole shape from the signals received at one or more receivers. The n-pole signal may be a monopole signal, dipole signal, quadrupole signal, or hexapole signal. If the tool contains sources that can generate a pure, single mode acoustic signal, balanced receivers, is in the center of the borehole, and the borehole is circular, the acoustic signal will propagate along the borehole walls with a single mode of propagation. If the acoustic signal traveling along borehole walls does not have a single mode of propagation, the signal's amplitudes and time delays are adjusted to produce a second acoustic signal. The second acoustic signal is generated from one or more tool sources. The second acoustic signal's amplitudes and time delays are further adjusted until the signal traveling along the borehole walls has a single mode of propagation. The method includes generating the adjusted signal to determine hydrocarbon properties of the formation.

BRIEF DESCRIPTION OF THE DRAWINGS

For a detailed description of the embodiments of the invention, reference will now be made to the accompanying drawings in which:

FIG. 4 is a top view of the borehole showing the acoustic logging tool off-center in a non-circular borehole;

FIG. 5a is a cross-sectional view of the acoustic signal pattern in the borehole and along the borehole walls generated by monopole sources in the logging tool;

FIG. 5b is a cross-sectional view of the acoustic signal pattern in the borehole and along the borehole walls generated by dipole sources in the logging tool;

FIG. 5c is a cross-sectional view of the acoustic signal pattern in the borehole and along the borehole walls generated by quadrupole sources in the logging tool;

FIG. 5d is a cross-sectional view of the acoustic signal pattern in the borehole and along the borehole walls produced by generalized n-pole sources in the logging tool;

Figure 1:
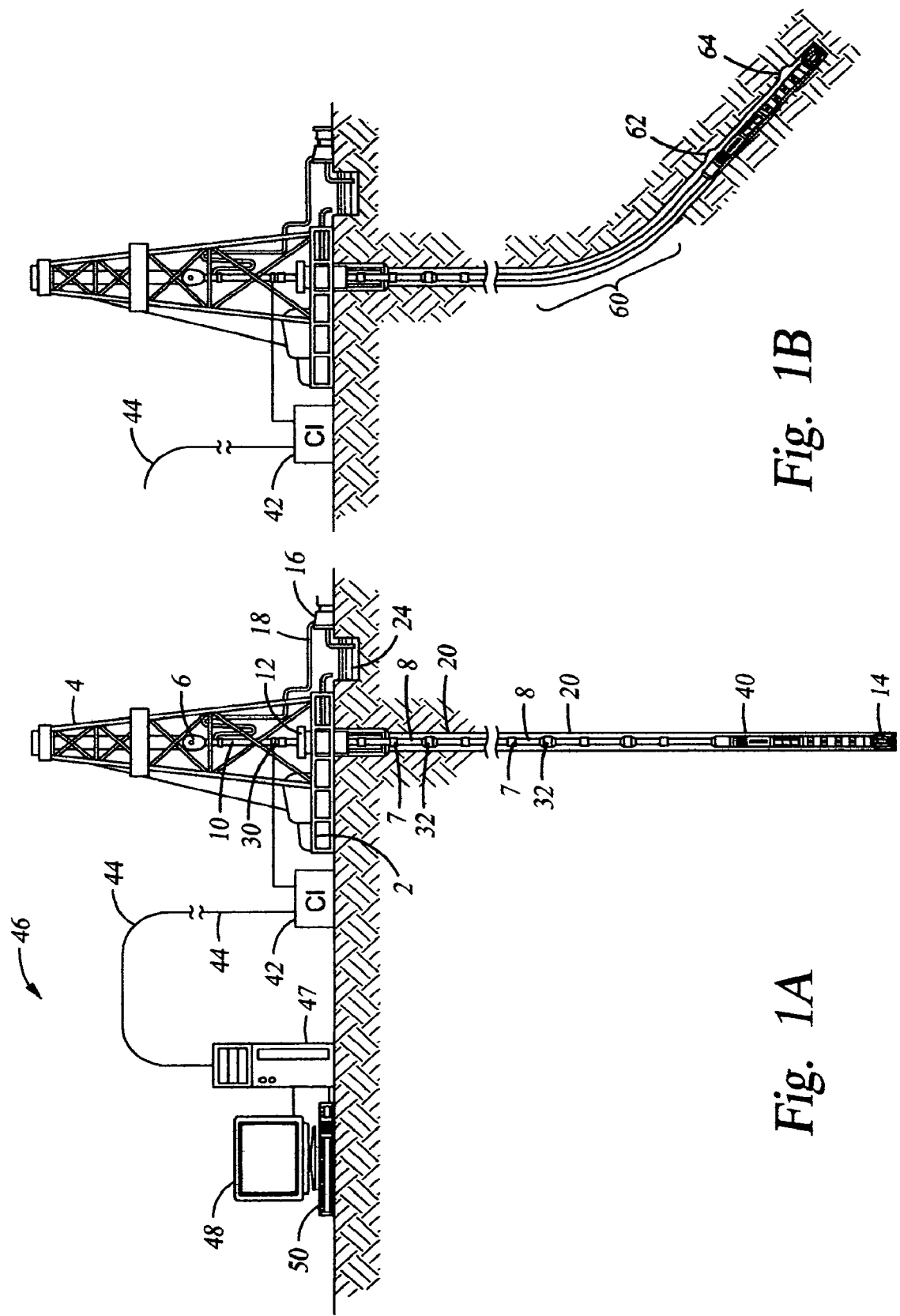
FIG. 1a is a schematic view of an LWD acoustic logging tool in accordance with some embodiments of the invention located in a drill string in a borehole, and a processing device at the surface.
FIG. 1b shows a schematic view of the LWD acoustic logging tool in accordance with some embodiments of the invention located in a deviated borehole.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The terms upstream and downstream refer generally, in the context of this disclosure, to the transmission of information from subsurface equipment to surface equipment, and from surface equipment to subsurface equipment, respectively. Additionally, the terms surface and subsurface are relative terms. The fact that a particular piece of hardware is described as being on the surface does not necessarily mean it must be physically above the surface of the earth; but rather, describes only the relative placement of the surface and subsurface pieces of equipment.

DETAILED DESCRIPTION OF EMBODIMENTS

FIG. 1a shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a kelly 10 that is used to lower the drill string 8 through rotary table 12. Connected to the lower end of the drill string 8 is a drill bit 14. The bit 14 is rotated and drilling accomplished by rotating the drill string 8, or by use of a downhole motor near the drill bit, or by both methods. Drilling fluid, termed mud, is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer (not specifically shown), and into a mud pit 24 on the surface. On the surface, the drilling mud is cleaned and then recirculated by recirculation equipment 16. The drilling mud is used to cool the drill bit 14, to carry cuttings from the base of the bore to the surface, and to balance the hydrostatic pressure in the rock formations. However, the system of FIG. 1a is not restricted to the use of mud as a drilling fluid. For example, in the case of under balanced drilling (UBD), other media such as aerated fluids or air/mist mixtures may be preferred over mud.

The acoustic logging tool shown in FIGS. 1a and 1b may have programmable sources that allow the tool to generate monopole (n=1), dipole (n=2), quadrupole (n=4), hexapole (n=6) or any other n-pole (for n being an even number) signals. Each kind of n-pole signal provides different sets of data that may be used to determine properties of the formation. Thus, for example, monopole sources may be used to generate a monopole mode of propagation along borehole walls for determining the velocities of compressional and shear waves. To confirm the accuracy of the compressional and shear wave velocities, the logging tool may include dipole sources for generating dipole mode of propagation along borehole walls. The dipole source can produce a different data set that may independently be used to determine the velocities of compressional and shear waves. A quadrupole source may be used to determine formation properties during logging when modes of propagation through the tool are interfering with collection of data. Monopole and dipole sources may create modes of propagation through the tool even if the tool has isolators at the source and receiver ends and in between the source and receiver (described in more detail below). Acoustic sources generating quadrupole signals reduce tool modes because the tool modes of the quadrupole signal cancel each other as they travel through the logging tool.

In accordance with some embodiments of the invention, programmable sources in LWD acoustic logging tool 40 shown in FIG. 1a located in drill string 8 produce an acoustic signal with a single mode of propagation along borehole walls 20. Receivers located in the LWD acoustic logging tool receive signals traveling through the borehole, formation, and along the borehole walls. In some embodiments of the invention, the received signals are processed by processing circuitry in the logging tool to determine the amplitudes and time delays for the source signal so that a single mode of propagation is excited along the borehole walls. Formation data determined from the received signals is sent to the surface where it is transmitted through communication interface 42 and communication link 44 to computer system 46. In some embodiments, communication link 44 may be a telephone cable or a wireless connection to computer system 46. Computer system 46 includes a central processing unit (CPU) 47 coupled to a viewing device 48 that, preferably, may be a computer display screen to view the logging data and input device 50 that, preferably, may be a computer keyboard.

In some embodiments of the invention, preliminary filtering and amplification of the received signal may be performed in the processing circuitry of the acoustic logging tool. Further processing to determine the source signal amplitudes and time delays so that a single mode of propagation is excited along the borehole walls may be done by computer system 46. Thus, the processing circuitry may be reduced in cost and complexity because it is used only for filtering and amplification of the received signal.

FIG. 1b shows the LWD acoustic logging tool in the drill string deviated towards the right 60 in the borehole. In some embodiments of the invention, the LWD acoustic logging tool may not have mechanical centralizer fins or may have very small fins for keeping the tool in the center of the borehole. In the logging while drilling environment, mechanical centralizers may cause interference in collection of logging data. For some embodiments of the invention, mechanical centralizers may interfere with generation of a single mode of propagation along borehole walls.

Without mechanical centralizers, the acoustic logging tool may not be in the center of the borehole as shown in FIG. 1b because the borehole is deviated. In some drilling situations, to reach hydrocarbon deposits in hard to reach sections of the formation, the drill string and acoustic logging tool may be in a horizontal borehole. The off-center location of the tool in the borehole interferes with collection of logging data because acoustic sources are not able to generate a signal with a single mode of propagation along borehole walls.

As shown in FIG. 1b, the borehole walls in sections 62 and 64 may not be uniformly circular. The noncircular shape of the borehole can also interfere with the acoustic sources ability to generate a signal with a single mode of propagation along the borehole walls.

Figure 2:
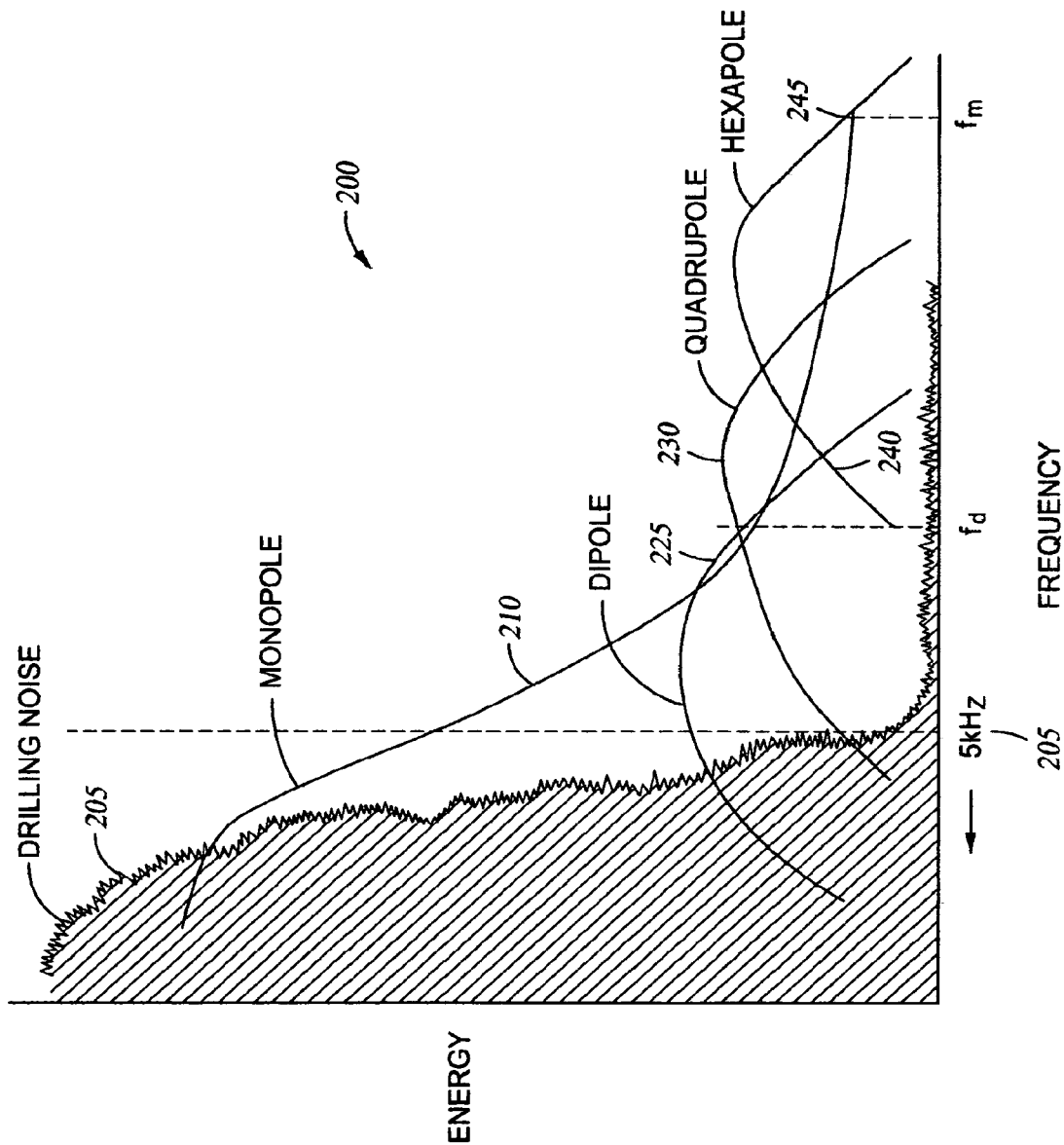
FIG. 2 is a graph of energy versus frequency showing the drilling noise and propagation modes for each n-pole signal source.

Turning to FIG. 2, the affects of drilling noise 205 on acoustic signals with an n-pole mode of propagation is shown. Conventional drilling noise 205 appears with the n-pole signal in the energy-frequency graph because the acoustic tool is logging as the drill bit drills the borehole. The energy-frequency graph shows the energy of the drilling noise and mode of propagation for each n-pole signal source over a range of frequencies. The drilling noise is attenuated at approximately 5 Kilohertz (KHz) 205 but interferes with the monopole 210, dipole 220, and quadrupole 230 propagation modes in the borehole below 5 KHz. Interference by the drilling noise may result in the monopole, dipole, and quadrupole modes of propagation becoming distorted as they travel along the borehole walls because the noise adds and subtracts from the propagation modes. Hexapole 240 and higher n-pole modes (not shown in FIG. 2) of propagation are not affected as much by the drilling noise as the monopole, dipole, and quadrupole modes of propagation. Filtering of the drilling noise 205 from the propagation mode signals is not effective because it filters out information at the frequencies of the drilling noise that includes the monopole, dipole, and quadrupole modes as shown in FIG. 2. To correctly receive data for propagation modes that are affected by drilling noise, the amplitude and time delays of the source signal may be modified as described below so that the propagation mode signal along borehole walls has minimal noise.

FIG. 2 also shows how each n-pole acoustic signal may be used to determine different formation properties. Low frequency acoustic signals travel through the formation while high frequency acoustic signals generally travel in the mud and water in the borehole. Thus, for a low frequency signal, the receivers receive a waveform that has traveled mostly through the formation. The velocity of propagation in the formation $V_f$ may therefore be determined by generating a low frequency monopole signal at less than 5 KHz as shown in FIG. 2. The velocity of propagation in the borehole mud and water $V_b$ may be determined by generating a high frequency $f_d$ dipole signal 225. Verification of $V_b$ may be performed by generating a very high frequency $f_m$ monopole signal 245 as shown in FIG. 2.

Noise caused by drilling of the borehole as the acoustic tool is logging, the noncircular nature of the borehole, and the acoustic tool located off-center in the borehole may result in the signal along the borehole walls not having a single mode of propagation. For example, if the sources generate monopole mode signals, the interference may result in monopole, dipole, and quadrupole modes excited along the borehole wall and received at the receivers. Separating out data sets from the multiple mode arrivals may not be possible or inaccurate, resulting in incorrect formation properties.

Figure 3:
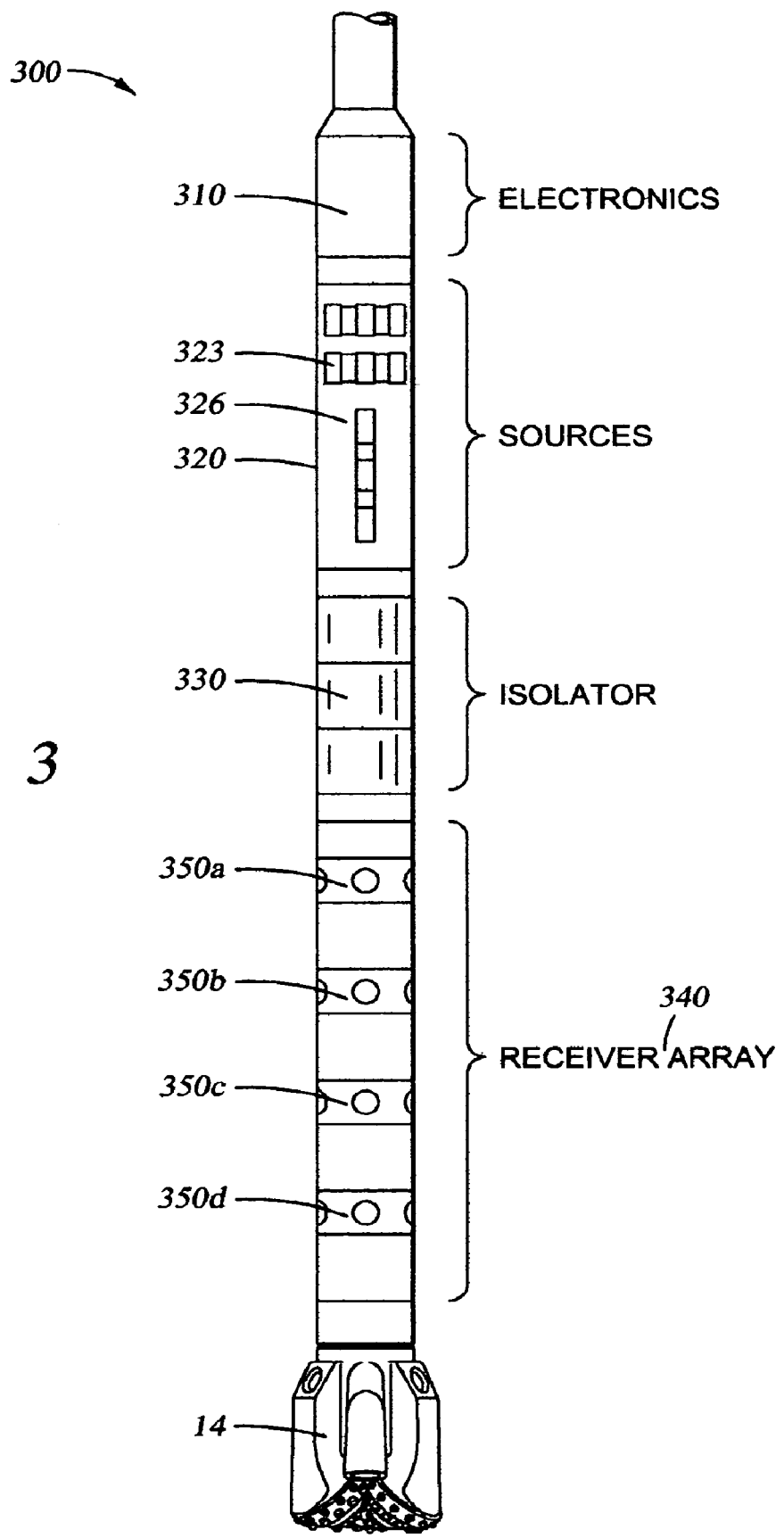
FIG. 3 is a more detailed schematic view of the acoustic logging tool in accordance with some embodiments of the invention shown in FIGS. 1a and 1b.

FIG. 3 shows the LWD acoustic logging tool 300 in more detail in accordance with some embodiments of the invention for the drill string shown in FIGS. 1a and 1b. Preferably, electronics section 310 may contain the processing circuitry shown in FIG. 6a or 6b that controls the sources 320 in the tool 300 and processes the signal from the receivers 340. Electronics section 310 may send information to the communication interface 42 located on the surface by using a phase-shift key (PSK) data transmission system. In the PSK transmission system, decreasing the carrier frequency provides a stronger signal at the risk of aliasing, especially with wide bandwidth signals. However, the carrier frequency may be decreased while increasing the number of phase states to achieve a higher data rate, without affecting the bandwidth. The PSK data transmission system provides a robust, low-power electromagnetic telemetry system with an increased data rate.

In some embodiments of the invention, electronics section 310 enables the operation of the acoustic logging tool by controlling the triggering and timing of the acoustic sources. A controller in the electronics section 310 fires the acoustic sources periodically, thereby producing acoustic pressure waves that propagate through the borehole fluid and into the surrounding formation. At the borehole boundary, some of the acoustic energy is converted into compressional waves that travel through the formation, and into shear waves that propagate along the interface between the borehole fluid and the formation. As these waves propagate past the receiver array 350, they cause pressure variations that can be detected by the receiver array elements. Preferably, the receiver array signals are processed in the digital signal processor (DSP) circuitry 628 shown in FIG. 6a or 6b to determine the formation characteristics. In some other embodiments of the invention, the receiver array signals are processed on the surface in computer system 46 to determine the formation characteristics.

The source section 320 includes a monopole source 323 and a pair of crossed-dipole sources 326. The monopole source 323 includes a piezoelectric crystal of cylindrical geometry. The crystal is mounted in an arrangement that allows the transmitted acoustic energy to be essentially uniform around the circumference of the tool. The monopole source is energized in the typical pulsed mode (described below with reference to FIG. 8), where an essentially pure monopole mode wave is emitted with a center frequency around 5-6 kHz and energy throughout the frequency band between 1 kHz and 12 kHz. This center frequency is between approximately a third and a half of the monopole source frequency of traditional monopole tools. The lower frequency results in a much greater depth of investigation for the compressional wave and refracted shear wave. The monopole source is utilized for derivation of the refracted arrivals from the full wave acquisition, i.e. the compressional wave velocity (as well as other associated properties such as energy, frequency content, etc.), the refracted shear wave velocity and its associated wave properties, and the Stoneley wave velocity with its own associated parameters.

Each of the dipole sources 326 includes two transducers mounted on opposite sides of the tool 300. The crossed dipoles are mounted perpendicularly, so that together, the crossed dipoles form an on-depth quad arrangement of transducers. Each of the four dipole source transducers are preferably of the "bender bar" type, i.e. a flexible surface having piezoelectric crystals on opposing sides. As the crystal on one side is driven to elongate, the crystal on the opposite side is driven to shrink. This causes the assembly to flex. Acoustic signals are transmitted by flexing the surface at the desired frequencies. The signal frequency is programmable, as described below, but the source transducers are preferably capable of signal frequencies between at least 0.5 kHz to 3 kHz.

The orthogonal positioning of the bender bar sources allows for a controlled X-X and Y-Y flexural wave generation. The sources are mounted in a way such that very little energy is coupled into the tool housing assembly, thus minimizing the excitation of unwanted acoustic waves in the tool itself. In addition, the source mounting ensures that there is no cross-excitation from one pair of the bender bars to the other, thus ensuring a proper acoustic dipole signature.

Isolator section 330 in FIG. 3 contains an acoustic isolation component. The acoustic isolator serves to attenuate and delay acoustic waves that propagate through the body of the tool from the sources 320 to the receiver array 340. Any standard acoustic isolator may be used. Preferably, the acoustic isolator can withstand 100,000 pounds force of push or pull, and provides for more than 90 dB of acoustic isolation over an extended frequency range, extending as low as about 500 Hz to 600 Hz.

In addition to the main isolator 330, additional acoustic wave isolators/absorbers are preferably placed on the receiver section both at the ends and between successive receiver sets (not shown in FIG. 3). Finally, the mounting of the dipole sources and the receivers themselves provides further isolation. The combination of all of the above allows the acoustic logging tool to properly acquire formation acoustic signals in the sub-kilohertz region, a region that is very close to the limit for the excitation of flexural waves. (The excitation function for the flexural waves exhibits a dramatic drop as the source frequency is reduced to the area of 600 Hz to 1 kHz; source operating frequencies below that level will excite predominantly tube waves with very little, if any, flexural wave components.)

Configuration of the sources in the manner described and shown in FIG. 3 allows generation of a monopole mode as shown in FIG. 5A by the monopole sources and generation of a dipole mode as shown in FIG. 5B by the dipole sources. In one embodiment of the invention, acoustic logging tool 300 also contains a receiver array 340 that consists of 16 receiver crystals arranged in four co-planar rings 350a-350d. In some other embodiments of the invention, the receiver array 340 consists of 32 receiver crystals arranged in eight co-planar rings. Each ring has four receivers mounted perpendicular to the tool axis and evenly distributed at 90 degrees from each other. The circumferential positioning of the receivers is preferably aligned with the dipole sources so that there are two in-line arrays and two cross-line arrays for both the X-X and Y-Y dipole sources. In the dipole acquisition mode, the in-line receiver array and the cross-line receiver array are each 2 by 8 arrangements of receivers.

In some embodiments, the receivers have a frequency response from 0.5 kHz to about 20 kHz. The 16 individual receivers are mounted in receiver pockets, slightly indented from the external surface of the tool housing. Each receiver is individually pressure and temperature compensated to the full extent of the operating specifications for the tool (e.g., 20,000 psi, 175 degrees Celsius). This allows for easy wellsite maintenance if one of the receivers is damaged for any reason, without the need for elaborate oil filling or evacuation stations.

Preferably, the acoustic sources 320 and receiver array 340 are based on piezoelectric elements designed to operate in downhole conditions. However, many other sources and detectors are suitable for downhole operation, and may be used.

Receivers in co-planar rings 350a-350d allow determination of the arrival times and velocities of acoustic signals traveling in the borehole, in the formation, and along the formation walls. Monopole mode waves first arrive at receiver ring 350a and then the same waveform arrives at receiver ring 350b after a time t (t is time needed for waveform to travel distance from receiver ring 350a to receiver ring 350b). Since the distance between the receiver rings is known, the velocity of the waveform in the formation $V_f$ and along the borehole walls $V_b$ can be determined by using the time t. As mentioned above, in alternative embodiments, eight levels of receiver arrays may be present allowing measurement of the velocity of large wavelength signals.

FIG. 4 illustrates a top view of a cross-section of a non-circular borehole 410 with the acoustic logging tool 40 off-center in the borehole. Borehole cross-section 410 may be from a deviated or horizontal borehole as shown in FIG. 1b, making the acoustic logging tool 40 lean to one side. Thus, the center of the tool may be located at point 440 and the approximate center of borehole 410 may be at point 430. The drill bit attached to the drill string may cause indentation 425 in the borehole wall, making the borehole cross section non-circular. Thus, an n-pole source may not generate an n-pole mode of propagation along borehole walls because the borehole is not circular and the tool is not in the center of the borehole as shown in FIG. 4.

Receivers at the same level receive the acoustic signal at approximately the same time if the tool is centered in the borehole and the borehole is circular. If, as shown in FIG. 4, the tool is not in the center of the borehole and the borehole is not circular, receivers at the same level will not receive the acoustic signal at the same time. This is because a signal generated by the source closer to the borehole wall in logging tool 40 has less distance to travel to the receivers close to the borehole wall. The reflected signals from the borehole walls on the side of the tool that is the greatest distance from the wall must travel a larger distance to reach the wall and return to the receivers in the tool. Stacking the signals for receivers at the same level will show if all of the signals have arrived at the same time. A signal arriving sooner than the other signals indicates receivers in the tool closer to the wall and the appropriate delay may be programmed into the receivers.

If the tool is not in the center of the borehole or the borehole is not circular as shown in FIG. 4, the amplitude of the signals from the acoustic sources will not be the same along the walls of the borehole. Because of the properties of the borehole mud, acoustic signals are attenuated as they travel through the mud. The signals generated by sources farther away from the borehole wall are more attenuated than signals generated by sources closer to the wall. This is because signals from farther sources must travel a larger distance through the mud to reach the wall. Thus, the acoustic signals generated by the sources closest to the borehole wall will have larger amplitudes along the borehole walls compared to the signals generated by sources farthest from the borehole walls. The signal amplitudes should be the same for an n-pole signal with a single mode of propagation along the borehole walls. Thus, if the tool is not in the center of the borehole or the borehole is not circular, the amplitudes received by the receivers will not be the same. A received signal with smaller amplitude indicates sources in the tool farther from the borehole wall; the amplitude level from the source may be increased to compensate for the attenuation and produce a signal with a single mode of propagation along the borehole walls.

Referring to FIGS. 5a-5d, these figures show cross-sections of the acoustic waveform pattern for monopole, dipole, quadrupole and n-pole signals, respectively, in the borehole 500 and along the borehole walls 410. In FIG. 5a, the monopole waveform pattern radiates sound equally in all directions and may be modeled as the cross section of a sphere whose radius alternately expands and contracts sinusoidally.

FIG. 5b shows a cross-section of the dipole signal in the borehole and along the borehole walls. The dipole waveform pattern may be considered two monopole waveforms of equal strength but opposite phase and separated by a small distance compared with the wavelength of sound. While one monopole waveform expands the other monopole waveform contracts. The dipole waveform pattern may be modeled as a sphere which oscillates back and forth, that is while the front is pushing outwards the back is sucking inwards. A dipole waveform pattern does not radiate sound equally in all directions. The waveform pattern appears like a figure eight—there are two regions 503 and 505 where sound is radiated very well, and two regions 507 and 510 where sound cancels.

FIG. 5c shows a cross-section of the quadrupole signal in the borehole and along the borehole walls. The quadrupole waveform pattern may be considered as two opposite dipole waveform patterns. The two dipole waveforms do not lie along the same line, that is they may be modeled as four monopoles with alternating phase at the corners of a square. Thus, the waveform pattern for quadrupole signal looks like a clover leaf pattern—sound is radiated well in front of each monopole "leaf" 520, 525, 530, and 535, but sound is canceled at points 522, 527, 532, and 537 equidistant from adjacent opposite monopole "leaves."

Finally, referring to FIG. 5d, a cross-section of the n-pole signal in the borehole and along the borehole walls is shown. The n-pole signal is the generalized waveform pattern for dipole signal, quadrupole signal, hexapole signal, octapole signal and so on. The n-pole waveform pattern may be considered as n/2 opposite dipole waveform patterns. The n/2 dipole waveform patterns do not lie along the same line, that is they may be modeled as n monopoles with alternating phase at the corners of an n-sided polygon. Thus, the waveform pattern for a generalized n-pole signal looks like a clover leaf pattern-sound is radiated well in front of each monopole "leaf" 540, 545, 550, 555, 560, 565 and 570, but sound is canceled at points 541, 542, 547, 552, 557, 562, 563 and 567 equidistant from adjacent opposite monopole "leaves."

Figure 6A:
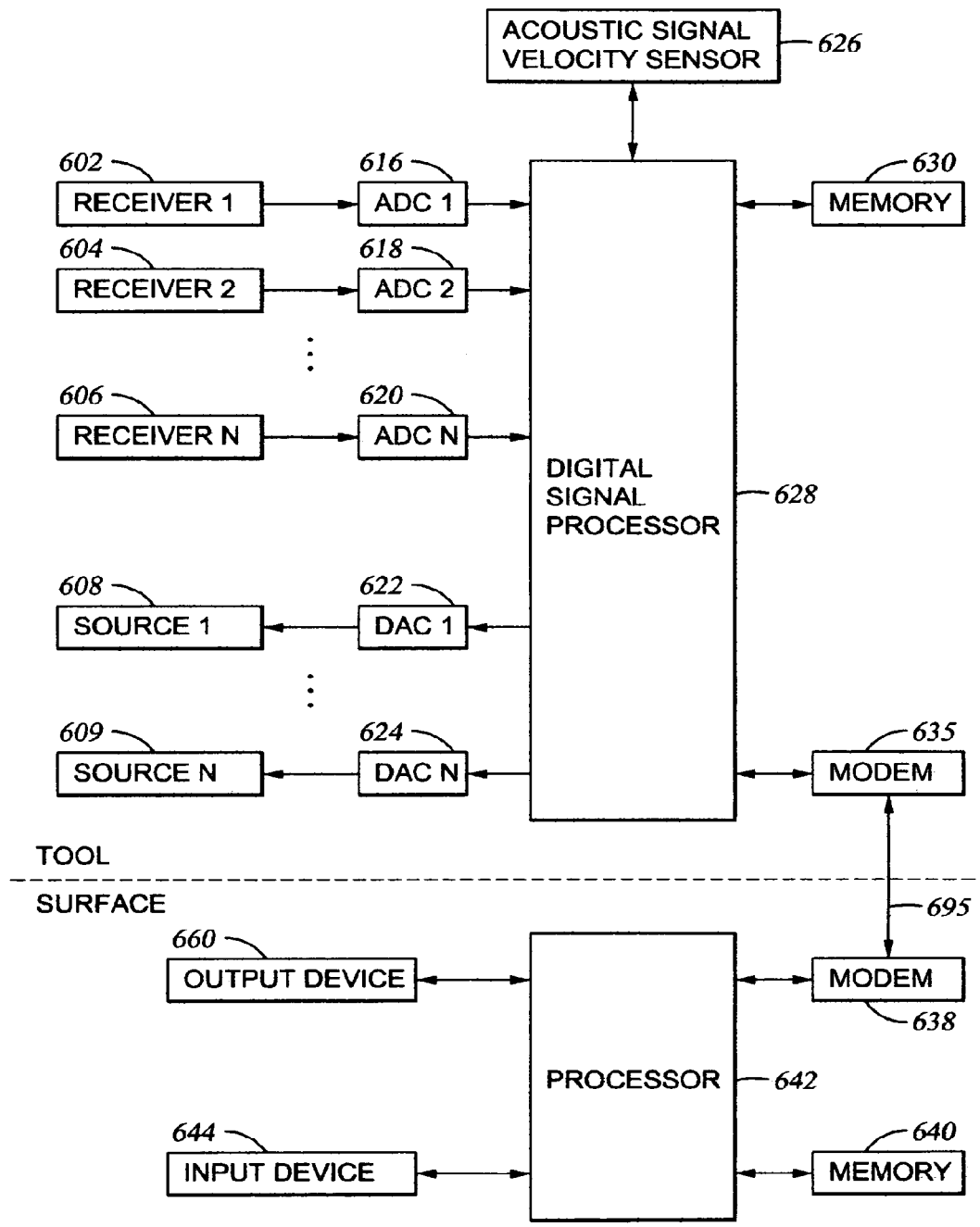
FIG. 6a shows a block diagram of the processing hardware in the tool and on the surface in accordance with some embodiments of the invention.

Turning now to FIG. 6a, a block diagram of the processing hardware in the tool and on the surface in accordance with some embodiments of the invention is shown. A number of receivers 602, 604, 606 are each coupled to an analog-to-digital converter (ADC) 616, 618, 620, respectively. The ADCs convert the analog acoustic signals to digital binary bits.

Digital signal processor (DSP) 628 may process the received digital acoustic signals to determine a time delay associated with any acoustic signal reflections. As part of the processing, DSP 628 may apply variable gain to compensate for attenuation, cross-correlate the receive signals with a signal model, and distinguish primary borehole wall reflections from secondary reflections and "false" reflections caused by bubbles or debris. DSP 628 may further collect orientation measurements from an azimuth sensor (not shown) and associate each time delay with an azimuth value.

Each time delay may be converted into a distance measurement, and the distance measurements may be combined to determine borehole shape and size, along with tool position in the borehole. Statistics on borehole diameter, tool offset, and tool motion may also be calculated. The conversion and combining may be performed downhole by DSP 628, or some of the processing may be performed on the surface. In any event, the time delay and azimuth measurements (and/or processed data) may be provided to a downhole modem 635 for transmission via a telemetry channel 695 to a surface modem 638. A processor 642 collects the information, and stores the information in memory 640 and/or a nonvolatile information storage device (not shown). The processor 642 may also execute software in memory 640. As shown in FIG. 1a, CPU 47 may include modem 638, memory 640, and processor 642. The software may configure processor 642 to interact with a user via an output device 660 and an input device 644. Output device 660 may be a computer display screen 48 and the input device 644 may be a computer keyboard 50 as shown in FIG. 1a. The user may be provided with a prompt and/or one or more options on output device 660, and may respond with commands via input device 644. In response to such input, the software may configure the processor 642 to process the information collected from downhole and present the results to the user in graphical fashion.

Figure 7:
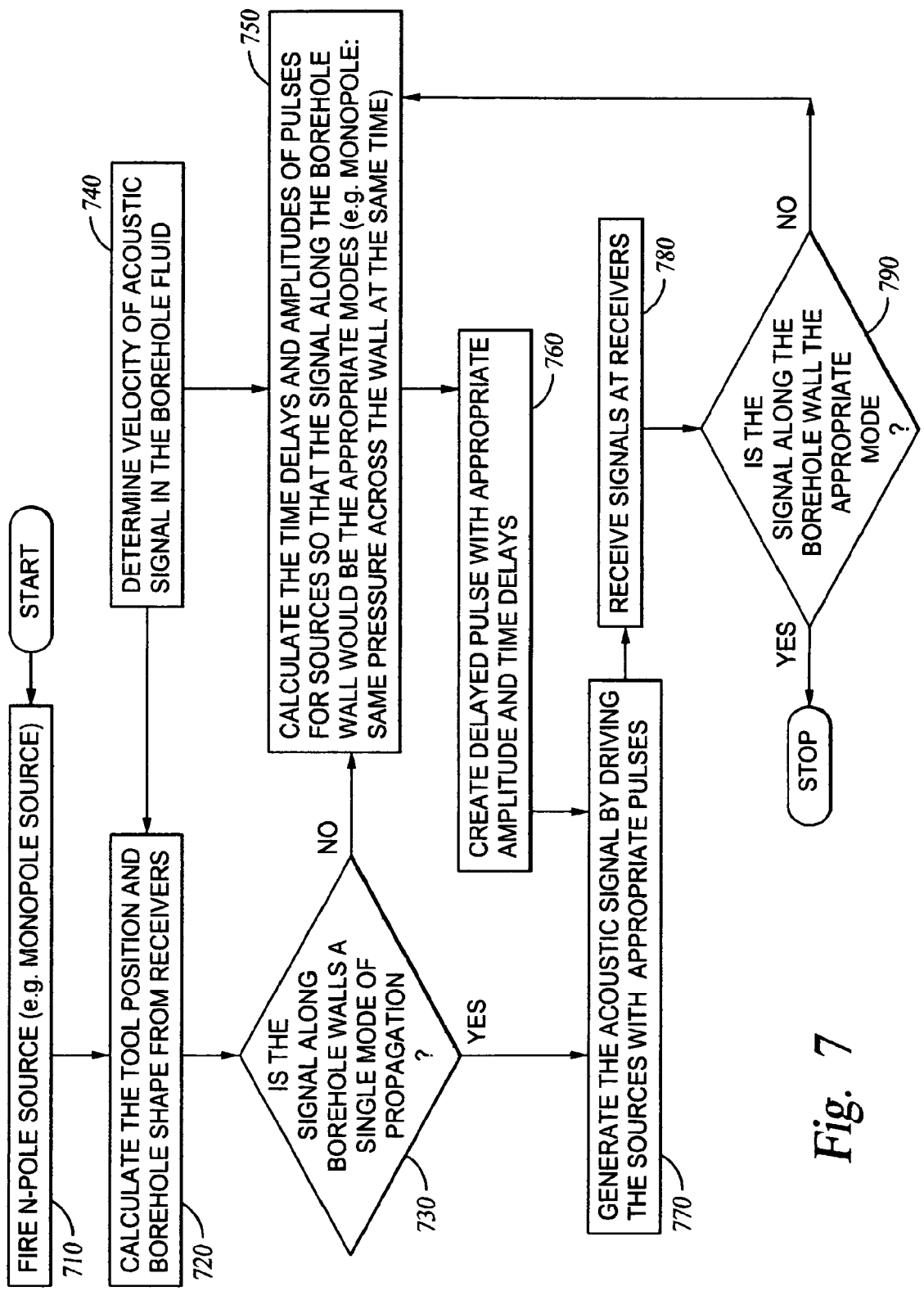
FIG. 7 shows a flow chart of an illustrative technique for generating an acoustic signal with a single mode of propagation that may be implemented by the system of FIG. 6a or FIG. 6b.

DSP 628 determines acoustic signals encoded in digital binary bits and sends the binary encoded acoustic signals to digital-to-analog converter (DAC) 622, 624 that convert the signals into analog signals for generation by sources 608, 609. DSP 628 may execute software or firmware that implements the flowchart shown in FIG. 7 (described in greater detail below) to produce an acoustic signal having a single mode of propagation along borehole walls. In alternative embodiments of the invention, processor 642 may execute software that implements the flowchart of FIG. 7 and DSP 628 may perform the functions as described in the paragraphs above. Receivers 602, 604, 606 receive the acoustic signal generated by the sources 608, 609 after the signals have traveled through the formation, borehole and along the borehole walls. Using the acoustic signal velocity in the borehole as shown in FIG. 7, the DSP 628 adjusts the acoustic signal so that the acoustic signal has a single mode of propagation along the borehole walls. The acoustic signal velocity in the borehole is determined from acoustic signal velocity sensor 626.

Figure 6B:
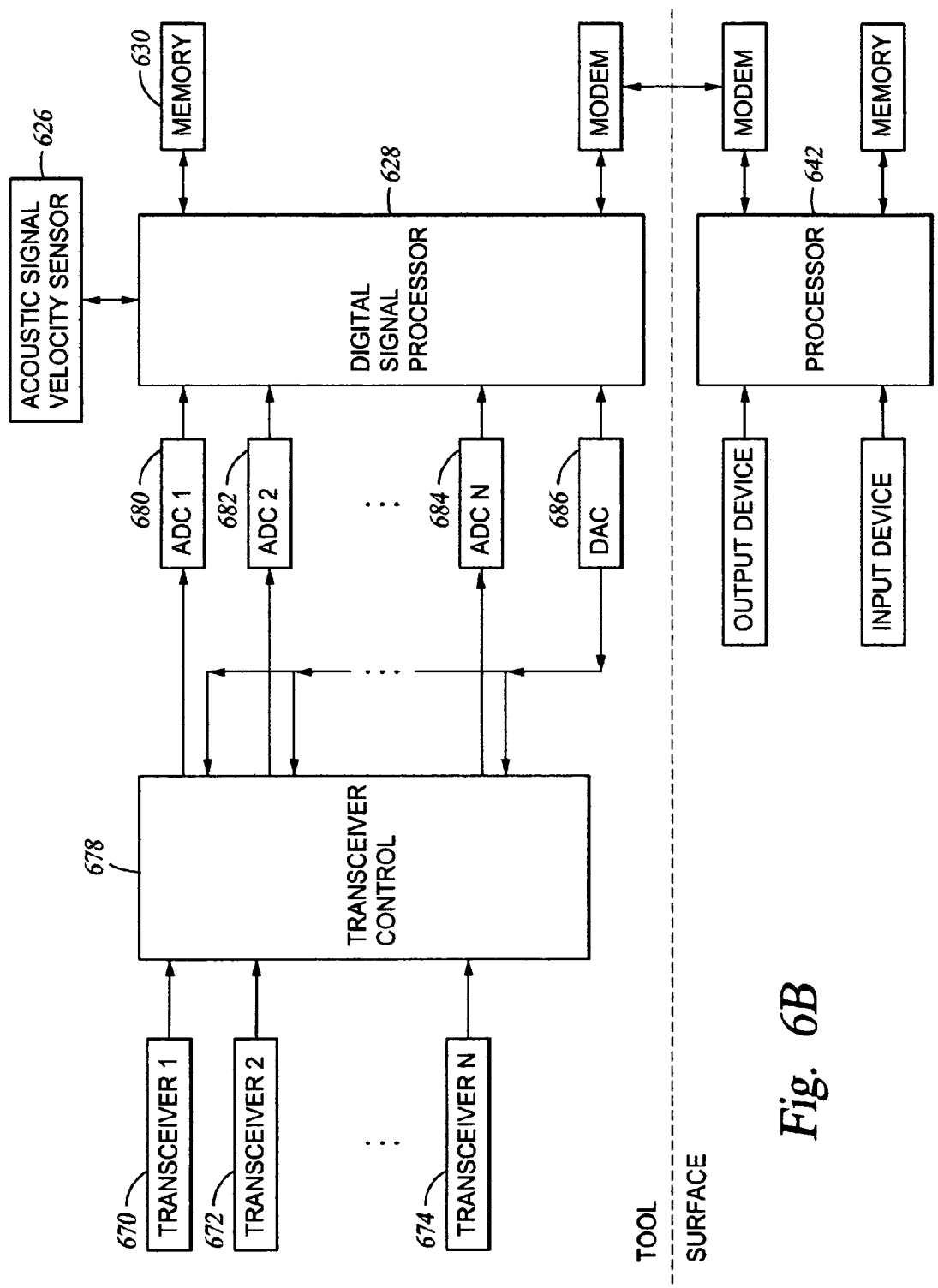
FIG. 6b shows in accordance with other embodiments of the invention a block diagram of the processing hardware in the tool and on the surface.

In some other embodiments of the invention shown in FIG. 6b, a number of acoustic transceivers 670, 672, 674 that can function as both source and receiver are coupled to a transceiver control switch 678. The transceiver control switch 678 configures the transceivers to operate in one of multiple arrangements. In a receive arrangement, the transceiver control switch 678 couples each of the transceivers 670, 672, 674 to a respective ADC 680, 682, 684. In a transmit arrangement, the transceiver control switch 678 couples a selected one of the transceivers 670, 672, or 674 to DAC 686, and isolates all transceivers 670, 672, 674 from their respective ADCs 680, 682, 684. The transceiver control switch 678 operates under control of DSP 628.

DSP 628 controls the transmission of acoustic signals and the reception of acoustic signal reflections. As part of the transmission process, DSP 628 may select an individual transceiver to be coupled to DAC 686. DSP 628 may then provide a signal to the transceiver via the DAC 686. As part of the receive process, DSP 628 may operate transceiver control switch 678 to couple each transceiver to a respective ADC. DSP 628 may then store the received signals in memory 630.

Turning now to FIG. 7, a flow chart of a technique for generating an acoustic signal with a single mode of propagation that may be implemented by the systems of FIG. 6a or FIG. 6b is shown. As mentioned above, the technique for generating an acoustic signal with a single mode of propagation may be implemented in software or firmware and executed by the DSP 628 or processor 642. In some embodiments of the invention, firmware implementing the technique shown in FIG. 7 may be present in memory 630 that may contain non-volatile electronically programmable read-only-memory (EPROM). Alternatively in some other embodiments, the software implementing FIG. 7 may be stored on a computer readable medium (not shown in FIG. 6a or 6b) for execution by processor 642.

The technique of FIG. 7 will be described with reference to FIG. 6a's configuration of source and receivers. An n-pole acoustic signal with n=1 (monopole), 2 (dipole), 4 (quadrupole) and so on for any even number n is produced in 710 by firing the sources 608, 609. In 720, the position of the acoustic logging tool in the borehole and shape of the borehole is determined using the acoustic signal received at receivers 602, 604, 606 and the acoustic signal velocity from block 740. Calculation of the tool position and borehole shape, as described above, includes the DSP processing the received digital acoustic signals to determine a time delay. Each time delay may be converted into a distance measurement, and the distance measurements may be combined to determine borehole shape, along with tool position within the borehole. Next, in block 730, the DSP determines if the signal along the borehole walls have a single mode of propagation. If the acoustic logging tool is in the center of the borehole and the borehole is circular as calculated in block 720, then the signal along the borehole walls will contain a single mode of propagation. Alternatively, another technique to determine if the signal along the borehole walls has a single mode of propagation is to cross-correlate the signal from the receivers with a known signal model of the n-pole (monopole, dipole, and so on) signal. If the signal along the borehole walls has a single mode of propagation, then the sources generate the acoustic signal in block 770 that is the same as the signal generated in block 710. If the signal along the borehole walls does not have a single mode of propagation, then in block 750 the time delays and amplitudes of pulses for the sources is calculated such that the signal along the borehole walls has a single mode of propagation. Determination of time delays and amplitudes for the acoustic signal pulses are described with reference to FIG. 4 above.

As described below, the velocity of the acoustic signal in the borehole fluid in 740 may be needed to calculate the time delays and amplitudes of signal pulses for the sources. In accordance with one embodiment, the acoustic impedance of the borehole fluid may be found using reflections from a precise metal disk, and therefrom the density of the borehole fluid. Because the reverberation characteristics of an acoustic wave depend in part on the acoustic wave shape, the first reflection from the metal disk may be used to calibrate the measurement. A technique for determining a velocity of the acoustic signal in the borehole fluid includes generating an acoustic signal within the borehole fluid, receiving reflections of the acoustic signal from the fluid, and analyzing a reverberation portion of the acoustic signal to determine the velocity. Analyzing the reverberation portion may include obtaining a theoretical reverberation signal and relating the measured reverberation signal with the theoretical reverberation signal to determine the velocity of the acoustic signal in the borehole fluid. The receiver sees a waveform consisting of a loud initial reflection followed by an exponentially decaying reverberation signal. If time t=0 is the time of generation of the acoustic wave at the source, then the time $T_{tran}$ represents the transit time (the time for the travel of this acoustic wave to the metal disk and to the receiver). Since the distance is fixed and known, the transit time $T_{tran}$ provides an indication of the acoustic signal velocity in the fluid.

Figure 8:
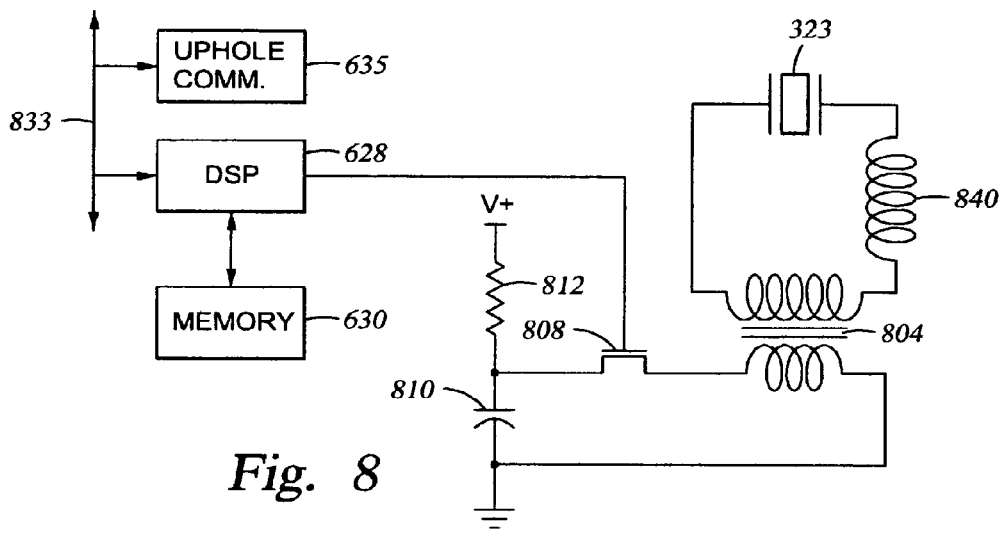
FIG. 8 shows a schematic of control electronics for the monopole source.

In 760, acoustic signal pulses with the determined time delays and amplitudes are created. The time delayed and amplitude adjusted acoustic signal is generated as shown in block 770 by driving the sources with the appropriate signal pulses. FIG. 8 provides a schematic for the control electronics of the monopole source. These control electronics are more-or-less representative of existing acoustic tools. The monopole source 323 is coupled to the secondary winding of a step-up transformer 804. (A tuning inductance 840 is commonly included to lower the resonant frequency of the signal.) The primary winding of transformer 804 is coupled to a capacitor 810, and a transistor 808 momentarily closes the current loop between the primary winding and the capacitor 810. When transistor 808 is off, the capacitor 810 is charged by a voltage source via a resistance 812 (or a transistor or other current-limiting means).

Transistor 808 is controlled by a controller 628. To "fire" the monopole source, the controller 628 asserts a control signal that turns transistor 808 on, thereby allowing capacitor 810 to discharge through the primary winding of transformer 804. This causes an oscillatory current in the secondary winding. This oscillatory current is an electrical signal that causes monopole source 323 to generate an acoustic signal.

In some embodiments, controller 628 is a DSP (FIGS. 6a-6b) that executes software stored in an attached memory 630. The controller 628 may be coupled to an uphole communications module 635 (FIG. 6a-6b modem 635) via a tool bus 833. A surface computer 47 (FIG. 1a) can communicate with the controller 628 to read and change operating parameters of the controller 628 and of the software algorithms. The monopole source is fully programmable in all its aspects including frequency, amplitude, emitted wave signature, and wave duration. In addition to the programmability of the dipole source characteristics, the electronics in the tool offer almost limitless control of the source "firing" sequence and the timing between consecutive firings.

Figure 9:
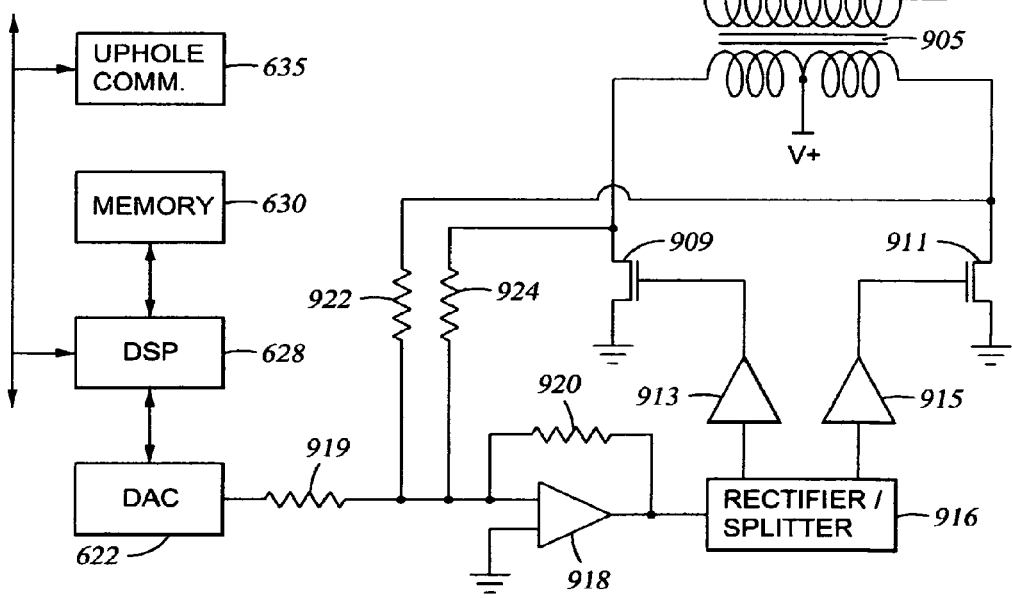
FIG. 9 shows a schematic of control electronics for a dipole source.

FIG. 9 provides a schematic for the control electronics for a dipole source. Unlike that of the monopole source, the drive circuits for the dipole source employ a linear driver configuration. Accordingly, the acoustic signal generated by source 326 closely tracks the analog signal generated by DAC 622 in response to a digital waveform provided by controller 628. The waveform may be stored in memory 630 or may be generated in accordance with the software stored therein. In an alternative embodiment, the waveform may be transmitted from the surface.

Dipole source 326 converts an electrical signal into an acoustic signal through voltage-induced expansion and contraction. The expansion and contraction of source 326 are respectively caused by positive and negative voltage differences across the terminals. Positive voltage differences are induced in the secondary winding of transformer 905 when transistor 909 turns on and transistor 911 is off. Conversely, negative voltage differences are induced when transistor 911 turns on and transistor 909 is off. The control signals for transistors 909, 911 are provided from a rectifier/splitter module 916 via amplifiers 913, 915.

The rectifier/splitter module 916 splits an input signal into two output signals. One of the output signals represents the input signal when the input signal is positive, and equals zero when the input signal is negative. The other output signal represents the negative of the input signal when the input signal is negative, and equals zero when the input signal is positive. Thus, both output signals are always positive or zero.

The remaining portion of the control electronics for the dipole source is summing amplifier 918. The output of summing amplifier 918 is provided as the input signal to rectifier/splitter module 916. The summing amplifier has a non-inverting input, which is grounded, and an inverting input, which receives a weighted sum of four signals: the analog signal from DAC 622, the output of summing amplifier 918, and the voltages on the outer terminals of the primary winding of transform 905. Each of the four signals is provided to the inverting input of summing amplifier 918 via a corresponding resistance 919, 920, 922, 924. The relative weights of resistances 919-924 are selected to cause the voltages on the outer terminals of the primary winding to track their respective portions of the analog signal as closely as possible. This design permits the use of high-power rated MOSFET transistors (which are typically nonlinear devices) in a high-power linear amplifier.

The programmability of the acoustic logging tool makes possible a variety of improved logging methods. In one improved logging method, the controller 628 may be programmed with a dipole waveform that maximizes the signal energy while minimizing the tool mode. That is, the programmed waveform may be a broadband signal with frequency nulls at vibration modes of the tool body.

Other parameters that are preferably programmable include: the firing rate, the digitizing interval (i.e. the sampling frequency of the A/D converter), and the number of samples acquired by each sensor.

For each of the improved logging methods, the adjusted parameters may be controlled from the surface, either automatically or by manual control; or they may be controlled by the tool itself (e.g. using adaptive control mechanisms or algorithms).

The acoustic logging tool is fully combinable with all logging suites, thus minimizing the number of logging trips required for formation evaluation. The low frequency monopole source (compared to other full waveform and dipole sonic tools) allows the compressional and shear wave velocity measurements to be obtained within similar depths of investigation, well beyond any near-wellbore altered region. And lastly, the on-depth crossed dipole sources and transmitter firing sequence, allows for all 16 dipole waveforms from the four level receiver array to be reliably used for anisotropy analysis without the need of depth shifting, or normalization of waveform data.

Returning to FIG. 7, acoustic signals after traveling through the formation, borehole, and along the borehole walls are received at the receivers as shown in block 780. If the wavefield along the borehole wall is not the appropriate mode of propagation, then the time delays and amplitudes of the pulses are recalculated in block 750 and generated by the sources. The loop from block 790 to block 750 is performed until the wavefield along the borehole wall is the appropriate mode of propagation. Acoustic logging of the formation around the tool in the borehole is performed once the wavefield along the borehole wall has a single mode of propagation. The tool continues logging as the drill bit progresses through the formation. As the logging tool is lowered into the next section of the borehole, the technique of FIG. 7 is restarted from block 710 to determine if the next borehole section is circular and the tool is in the center of the borehole.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An acoustic logging tool that comprises:
    a plurality of sources that includes at least one m-pole source and at least one n-pole source, wherein m and n are unequal positive integers;
    a plurality of receivers that detect acoustic signals propagating along a borehole wall in response to operation of one or more of the plurality of sources; and
    a memory having software that causes a processing device to determine whether the acoustic signals detected by the plurality of receivers have more than one propagation mode, and further causes the processing device to provide the plurality of sources with signals having at least one amplitude or time delay adjusted to cause a subsequent acoustic signal to propagate along the borehole wall in a single mode.

2. The tool of claim 1, wherein the plurality of sources includes a monopole source (m=1) and a dipole source (n=2), wherein said single mode is the monopole mode, and wherein the dipole source signal is calculated to reduce dipole mode interference from acoustic signals propagating in the monopole mode.

3. The tool of claim 2, wherein the plurality of sources further includes a second dipole source orthogonal to the other dipole source.

4. The tool of claim 3, wherein the processing device determines a compressional wave velocity and a shear wave velocity of a surrounding formation based at least in part on an analysis of the subsequent acoustic signal.

5. The tool of claim 1, wherein the m-pole source and n-pole sources are in the group consisting of a monopole source, a dipole source, a quadrupole source, and a hexapole source.

6. The tool of claim 1, wherein the processing device determines a sound velocity in a borehole fluid.

7. The tool of claim 6, wherein the processing device determines a borehole shape and a tool position based at least in part on signals from the plurality of receivers, and further determines amplitude or time delay adjustments based at least in part on the borehole shape, the tool position, and said sound velocity.

8. The tool of claim 1, wherein the software causes the processing device to correlate signals from the plurality of receivers with an n-pole signal model, and to determine amplitude or time delay adjustments based at least in part on results from said correlation.

9. An acoustic logging method that comprises:
providing source signals to a plurality of sources to generate an acoustic signal that propagates along a borehole wall;
detecting the acoustic signal with a plurality of receivers;
using a processing device to determine whether the acoustic signal propagated in more than one mode along the borehole wall; and
adjusting at least one amplitude or time delay of the source signals so that a subsequent acoustic signal propagates along the borehole wall in a single mode,
wherein the plurality of sources includes at least one m-pole source and at least one n-pole source, wherein m and n are unequal positive integers.

10. The method of claim 9, wherein the plurality of sources includes a monopole source (m=1) and a dipole source (n=2), wherein said single mode is the monopole mode, and wherein the dipole source signal is calculated to reduce dipole mode interference from acoustic signals propagating in the monopole mode.

11. The method of claim 10, wherein the plurality of sources further includes a second dipole source orthogonal to the other dipole source.

12. The method of claim 11, wherein the processing device determines a compressional wave velocity and a shear wave velocity of a surrounding formation based at least in part on measurements determined from the subsequent acoustic signal.

13. The method of claim 9, wherein the m-pole source and n-pole sources are in the group consisting of a monopole source, a dipole source, a quadrupole source, and a hexapole source.

14. The method of claim 9, wherein said using a processing device comprises determining a sound velocity in a borehole fluid.

15. The method of claim 14, wherein said using a processing device further comprises determining a borehole shape and a tool position based at least in part on signals from the plurality of receivers, and wherein said adjusting is based at least in part on the borehole shape, the tool position, and said sound velocity.

16. The method of claim 9, wherein said using a processing device comprises correlating signals from the plurality of receivers with an n-pole signal model, and wherein said adjusting is based at least in part on results from said correlation.

17. The method of claim 9, further comprising drilling a borehole while performing said providing, detecting, using, and adjusting operations.

18. A logging tool to generate an acoustic signal in a borehole, comprising:
a plurality of sources including at least one source that generates a first acoustic signal that propagates along a borehole wall in an n-pole mode;
at least one receiver that receives the first acoustic signal propagating along the borehole wall; and
a processing device that couples to the at least one source and the at least one receiver, said processing device adjusting pulse amplitudes and time delays for the plurality of sources so that the plurality of sources generate a second acoustic signal with a single mode of propagation if the first acoustic signal includes interference from propagation modes other than the n-pole mode.

19. The tool of claim 18, wherein the adjustment of pulse amplitudes and time delays is performed iteratively until an acoustic signal propagates along the borehole wall in a single propagation mode.

20. The tool of claim 18, wherein the processing device determines a borehole shape and a tool position based at least in part on signals from the at least one receiver, and wherein the adjustment of pulse amplitudes and time delays is calculated from the borehole shape and the tool position.

* * * * *